(12) United States Patent
Yi

(10) Patent No.: US 12,061,770 B2
(45) Date of Patent: Aug. 13, 2024

(54) APPLICATION INTERFACE DISPLAY METHOD AND MOBILE TERMINAL

(71) Applicant: VIVO MOBILE COMMUNICATION CO., LTD., Guangdong (CN)

(72) Inventor: Ning Yi, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 17/513,758

(22) Filed: Oct. 28, 2021

(65) Prior Publication Data
US 2022/0053082 A1 Feb. 17, 2022

Related U.S. Application Data

(63) Continuation of application No. PCT/CN2020/081312, filed on Mar. 26, 2020.

(30) Foreign Application Priority Data

Apr. 29, 2019 (CN) .................. 201910357561.X

(51) Int. Cl.
*G06F 3/0482* (2013.01)
*G06F 3/0488* (2022.01)
(Continued)

(52) U.S. Cl.
CPC .......... *G06F 3/0482* (2013.01); *G06F 3/0488* (2013.01); *G06F 3/04886* (2013.01);
(Continued)

(58) Field of Classification Search
CPC ......... H04M 1/72472; H04M 1/72469; H04M 1/72403; G06F 3/0482; G06F 3/0488; G06F 3/04886; G06F 2203/04803
See application file for complete search history.

(56) References Cited

U.S. PATENT DOCUMENTS

2005/0223339 A1* 10/2005 Lee .................. H04N 21/47
715/713
2008/0059913 A1 3/2008 Burtner et al.
(Continued)

FOREIGN PATENT DOCUMENTS

CN 102385485 A 3/2012
CN 103049176 A 4/2013
(Continued)

OTHER PUBLICATIONS

Extended European Search Report for application 20798121.8 issued by the European Patent Office on May 25, 2022.
(Continued)

*Primary Examiner* — Nicholas Ulrich
(74) *Attorney, Agent, or Firm* — IP & T GROUP LLP

(57) ABSTRACT

An application interface display method includes: receiving a first operation performed by a user for a target application program interface, where the target application program interface includes at least one function option; in response to the first operation, controlling the target application program interface to be displayed in a first display area through shrinking; receiving a second operation performed by the user for a target function option in the target application program interface; and displaying, in a second display area, a function option at a level that corresponds to the second operation and that is of the target function option; or displaying, in the first display area and a second display area, function options at two adjacent levels of the target function option, respectively. The second display area is an area outside the first display area in a current display interface.

5 Claims, 10 Drawing Sheets

(51) Int. Cl.
*G06F 3/04886* (2022.01)
*H04M 1/72403* (2021.01)
*H04M 1/72469* (2021.01)

(52) U.S. Cl.
CPC ... *H04M 1/72403* (2021.01); *H04M 1/72469* (2021.01); *H04M 2201/42* (2013.01)

(56) References Cited

U.S. PATENT DOCUMENTS

| | | | |
|---|---|---|---|
| 2010/0088641 | A1 | 4/2010 | Choi |
| 2012/0030622 | A1* | 2/2012 | Hasegawa ............ G06F 3/0482 715/811 |
| 2013/0339904 | A1* | 12/2013 | Geithner ............... G06F 3/0488 715/834 |
| 2015/0186397 | A1* | 7/2015 | Cueto ................. G06F 3/04883 715/854 |
| 2018/0189099 | A1 | 7/2018 | Meng |
| 2021/0352173 | A1* | 11/2021 | Yang ................... G06F 3/04842 |

FOREIGN PATENT DOCUMENTS

| | | |
|---|---|---|
| CN | 103235781 A | 8/2013 |
| CN | 104252290 A | 12/2014 |
| CN | 105426083 A | 3/2016 |
| CN | 106507173 A | 3/2017 |
| CN | 106569681 A | 4/2017 |
| CN | 106843664 A | 6/2017 |
| CN | 107132966 A | 9/2017 |
| CN | 107943372 A | 4/2018 |
| CN | 108268251 A | 7/2018 |
| CN | 108536360 A | 9/2018 |
| CN | 109255000 A | 1/2019 |
| CN | 109408174 A | 3/2019 |
| CN | 109426415 A | 3/2019 |
| CN | 109471692 A | 3/2019 |
| CN | 109582192 A | 4/2019 |
| CN | 110109604 A | 8/2019 |

OTHER PUBLICATIONS

International Search Report of International Application No. PCT/CN2020/081312 mailed on Jun. 23, 2020.
Written Opinion of The International Searching Authority of International Application No. PCT/CN2020/081312 mailed on Jun. 23, 3030.
Notification to Grant Patent Right for Invention for CN Patent Application No. 201910357561.X mailed on Feb. 20, 2021.
First Office Action of Priority Application No. 201910357561.X mailed on Jun. 2, 2020.
Second Office Action of Priority Application No. 201910357561.X mailed on Nov. 6, 2020.

* cited by examiner

APPLICATION INTERFACE DISPLAY METHOD AND MOBILE TERMINAL

CROSS-REFERENCE TO RELATED APPLICATIONS

This application is a Bypass Continuation Application of PCT/CN2020/081312 filed on Mar. 26, 2020, which claims priority to Chinese Patent Application No. 201910357651.X filed on Apr. 29, 2019, which are incorporated herein by reference in their entirety.

TECHNICAL FIELD

The present disclosure relates to the field of communications technologies, and in particular, to an application interface display method and a mobile terminal.

BACKGROUND

With diversified development of functions of an application program on a mobile terminal, more and more function levels are included in the application program.

Function options included in an application program are generally displayed level by level, that is, each interface displays only a function option at one level, and a function option at a next level needs to be entered from the function option at the current level. In this way, when a level in which a function needs to be searched is located is relatively deep, viewing and operating need to be performed level by level, which is relatively inconvenient.

It can be learned from the foregoing that, function options included in an application program are displayed level by level in the related art, and consequently function searching is relatively inconvenient.

SUMMARY

According to a first aspect, an embodiment of the present disclosure provides an application interface display method, applied to a mobile terminal and including:
 receiving a first operation performed by a user for a target application program interface, where the target application program interface includes at least one function option;
 in response to the first operation, controlling the target application program interface to be displayed in a first display area through shrinking;
 receiving a second operation performed by the user for a target function option in the target application program interface; and
 displaying, in a second display area, a function option at a level that corresponds to the second operation and that is of the target function option; or displaying, in the first display area and the second display area, function options at two adjacent levels of the target function option, respectively; where the second display area is an area that is outside the first display area in a current display interface.

According to a second aspect, an embodiment of the present disclosure further provides a mobile terminal, including:
 a first receiving module, configured to receive a first operation performed by a user for a target application program interface, where the target application program interface includes at least one function option;
 a first control module, configured to: in response to the first operation, control the target application program interface to be displayed in a first display area through shrinking;
 a second receiving module, configured to receive a second operation performed by the user for a target function option in the target application program interface; and
 a first display module, configured to: display, in a second display area, a function option at a level that corresponds to the second operation and that is of the target function option; or display, in the first display area and a second display area, function options at two adjacent levels of the target function option, respectively, where the second display area is an area that is outside the first display area in a current display interface.

According to a third aspect, an embodiment of the present disclosure further provides a mobile terminal, including a processor, a memory, a computer program that is stored in the memory and executable on the processor, and when the computer program is executed by the processor, the steps of the foregoing application interface display method are implemented.

According to a fourth aspect, an embodiment of the present disclosure further provides a non-transitory computer-readable storage medium, where the non-transitory computer-readable storage medium stores a computer program, and when the computer program is executed by a processor, the steps of the foregoing application interface display method are implemented.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

Figure 1:
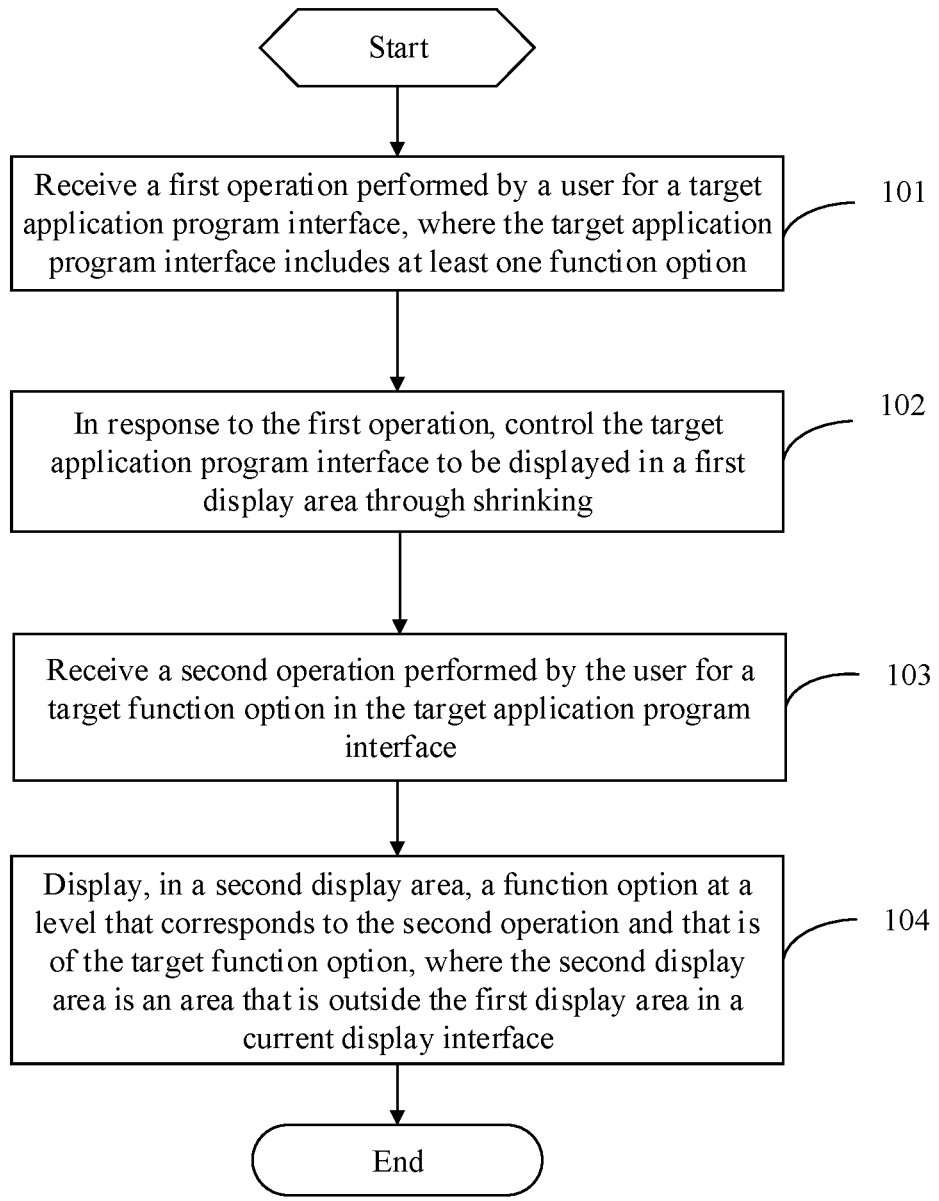
FIG. 1 is a flowchart of an application interface display method according to some embodiments of the present disclosure.

Referring to FIG. 1, FIG. 1 is a flowchart of an application interface display method according to some embodiments of the present disclosure. The application interface display method shown in FIG. 1 may be applied to a mobile terminal.

In practical application, the mobile terminal may be a mobile phone, a tablet personal computer, a laptop computer, a personal digital assistant (PDA), a mobile Internet device (MID), a wearable device, or the like.

As shown in FIG. 1, the application interface display method may include the following steps.

Step 101: Receive a first operation performed by a user for a target application program interface, where the target application program interface includes at least one function option.

Step 102: In response to the first operation, control the target application program interface to be displayed in a first display area through shrinking.

Step 103: Receive a second operation performed by the user for a target function option in the target application program interface.

Step 104: Display, in a second display area, a function option at a level that corresponds to the second operation and that is of the target function option, where the second display area is an area that is outside the first display area in a current display interface.

The target application program may be any application program installed on the mobile terminal. For example, the target application program may be a system setting application program, a file management application program, a cloud storage application program, a social application program, a video play application program, or an audio play application program installed on the mobile terminal. The target application program interface may be a main interface of the target application program, or may be an interface of the target application program other than the main interface. Herein, the main interface of the target application program may be understood as the first interface displayed by the mobile terminal after the user opens the target application program. The function option may be a control such as an icon, a text, or a button.

The first operation may be an operation used to instruct to display the target application program interface in the first display area through shrinking. The first operation may be a touch operation, for example, a click operation, a single-finger slide operation, or an inward double-finger slide operation. The first operation may also be a sound control operation.

The controlling the target application program interface to be scaled down may be understood as: controlling the target application program interface to be scaled down to a preset proportion of an original target application program interface. Herein, the preset proportion may be preset to a value (for example, 60%, 75%, or 80%), and the preset proportion may also be a value determined based on the number of function options at a level that includes the maximum number of function options and a preset formula. The first display area may be an intermediate area of the current display interface, or may be an edge area of the current display interface.

For ease of understanding the "controlling the target application program interface to be displayed in a first display area through shrinking", herein, an example in which a system setting application program is the target application program, and a main interface of the system setting application program is the target application program interface is used for description.

Figure 2:
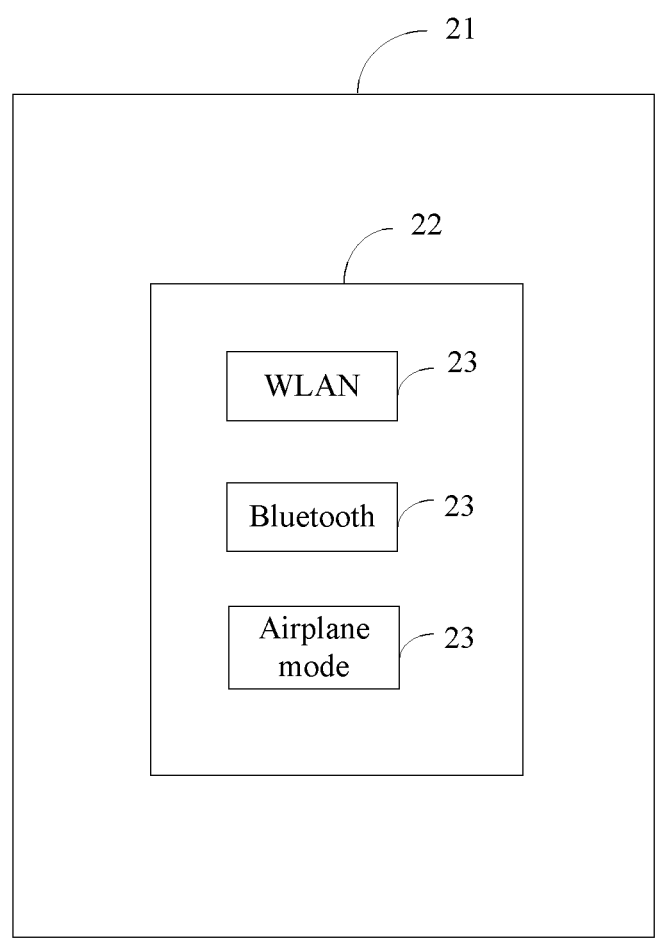
FIG. 2 is an example diagram 1 of an application interface display method according to some embodiments of the present disclosure.

Referring to FIG. 2, FIG. 2 is an example diagram of a display effect of the current display interface after the main interface of the system setting application program is controlled to be displayed in the first display area through shrinking, where 21 shown in FIG. 2 represents the current display interface, 22 shown in FIG. 2 represents the shrunk main interface of the system setting application program, and 23 shown in FIG. 2 represents a function option in the main interface of the system setting application program.

The receiving a second operation performed by the user for a target function option in the target application program interface may be understood as: receiving the second operation performed by the user for the target function option in the shrunk target application program interface (that is, the target application program interface displayed in the first display area). The target function option may be any of the function options included in the target application program interface.

The second operation may be an operation used to instruct to display a function option at a target level of the target function option in the second display area. Herein, the target level may be determined based on the second operation. The second operation may be a touch operation, for example, a click operation or a slide operation. The second operation may also be a sound control operation.

It should be noted that the current display interface may include only the first display area and the second display area. The current display interface may also include a first display area, a second display area, and another display area.

It should be noted that, when the target application program interface is controlled to be displayed in the first display area through shrinking, or after the target application program interface is controlled to be displayed in the first display area through shrinking and before step 104, content may be displayed (for example, at least one function option of the target application program may be displayed) or no content may be displayed in a display area (for example, the second display area) of the current display interface other than the first display area. This is not limited in this embodiment of the present disclosure.

In this embodiment of the present disclosure, because the mobile terminal may directly display a function option at a corresponding level by receiving an operation, viewing and operating of multi-level function options do not need to be performed level by level, so that viewing and operating of a function option can be simplified, and further function searching can be more convenient.

Optionally, after the receiving a first operation performed by a user for a target application program interface, the application interface display method further includes:

in response to the first operation, displaying at least one common function option in the second display area, where the common function option is a function option for which access times exceeds preset times.

The common function option may be a function option for which access times at a level of a function option in the target application program interface exceeds the preset times. For example, when the target application program is a system setting application program, the common function option may be a wireless local area network (WLAN) switch, a Bluetooth switch, a flight mode, or the like.

When a plurality of common function options are displayed in the second display area, the plurality of common function options may be a plurality of function options at a same level of a same function option in the target application program interface; or the plurality of common function options may be a plurality of function options at different levels of a same function option in the target application program interface; or the plurality of common function options may be a plurality of function options at a same level of different function options in the target application program interface; or the plurality of common function options may be a plurality of function options at different levels of different function options in the target application program interface.

The at least one common function option can be displayed in the second display area in response to the first operation, so that the common function option can be directly viewed from the second display area after the target application program interface program is shrunk. In this way, convenience of function searching can be further improved.

In this embodiment of the present disclosure, step 104 may be corresponding to a plurality of different implementations. Specific descriptions are as follows:

Optionally, the receiving a second operation performed by the user for a target function option in the target application program interface includes:

displaying a plurality of level options of the target function option in the first display area; and
receiving a second operation performed by the user for a target level option in the plurality of level options; and
the displaying, in a second display area, a function option at a level that corresponds to the second operation and that is of the target function option includes:
displaying a function option at a target level of the target function option in the second display area, where the target level is a level corresponding to the target level option.

The step of displaying a plurality of level options of the target function option in the first display area may be automatically triggered by the mobile terminal; or may be triggered through an operation performed by the user, for example, a touch operation or a sound control operation performed by the user for the target function option in the shrunk target application program interface.

The plurality of level options may be some or all level options of the target function option. Each of the plurality of level options may be different levels that are respectively corresponding to the target function option.

The displaying a plurality of level options of the target function option in the first display area may be displaying the plurality of level options of the target function option at a position that is adjacent to a display position of the target function option in the first display area; or displaying the plurality of level options of the target function option at a position that is in the first display area and that is not adjacent to the display position of the target function option.

The target level option may be any one of the plurality of level options. The displaying a function option at a target level of the target function option in the second display area may be understood as displaying some function options at the target level of the target function option in the second display area, or may be understood as displaying all function options at the target level of the target function option in the second display area.

For ease of understanding, herein, an example in which a system setting application program is the target application program, a main interface of the system setting application program is the target application program interface, and a WLAN option is the target function option (assuming that the target function option WLAN includes three levels, where function options at a first level include a WLAN switch, a WLAN list, a network assistant, and an advanced setting, function options at a second level include a WLAN sleep policy, WLAN certificate management, and a wireless fidelity protected setup (WPS) button, and function options at a third level include installation of a wireless local area network authentication and privacy infrastructure (WAPI) certificate) is used for description.

Figure 3:
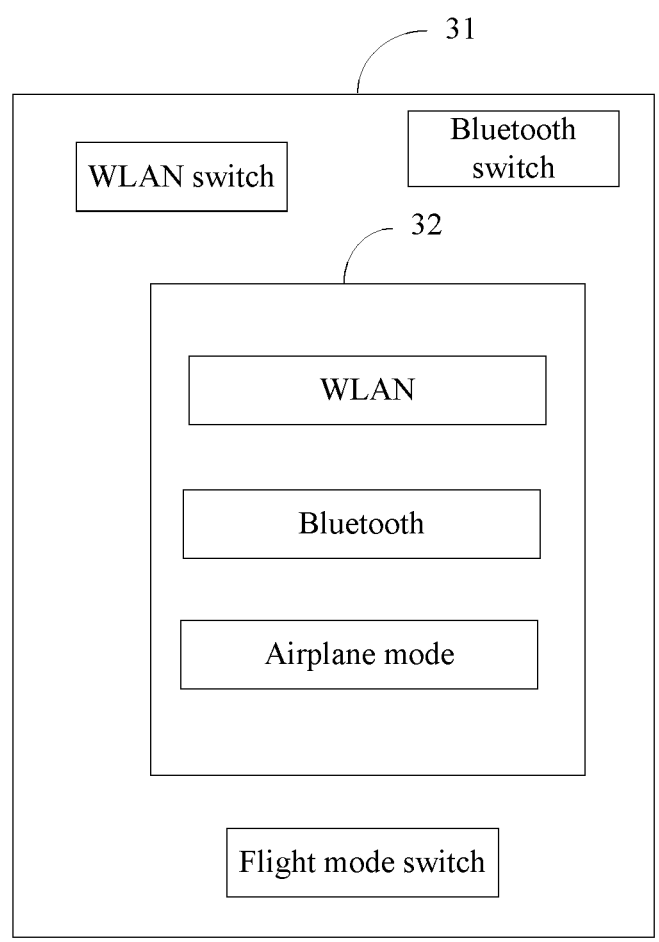
FIG. 3 is an example diagram 2 of an application interface display method according to some embodiments of the present disclosure.

First, the user inputs an inward dual-finger slide operation (the inward dual-finger slide operation may be understood as the first operation in this embodiment) in the main interface of the system setting application program. In response to the inward dual-finger slide operation, the mobile terminal controls the main interface of the system setting application program to be displayed in an intermediate area of the current display interface through shrinking (the intermediate area of the current display interface may be understood as the first display area in this embodiment), and displays the common function option in an edge area around the current display interface (the edge area around the current display interface may be understood as the second display area in this embodiment) (in this case, a display effect of the mobile terminal is shown in FIG. 3, 31 shown in FIG. 3 represents the current display interface, and 32 shown in FIG. 3 represents the main interface of the shrunk system setting application program).

Figure 4:
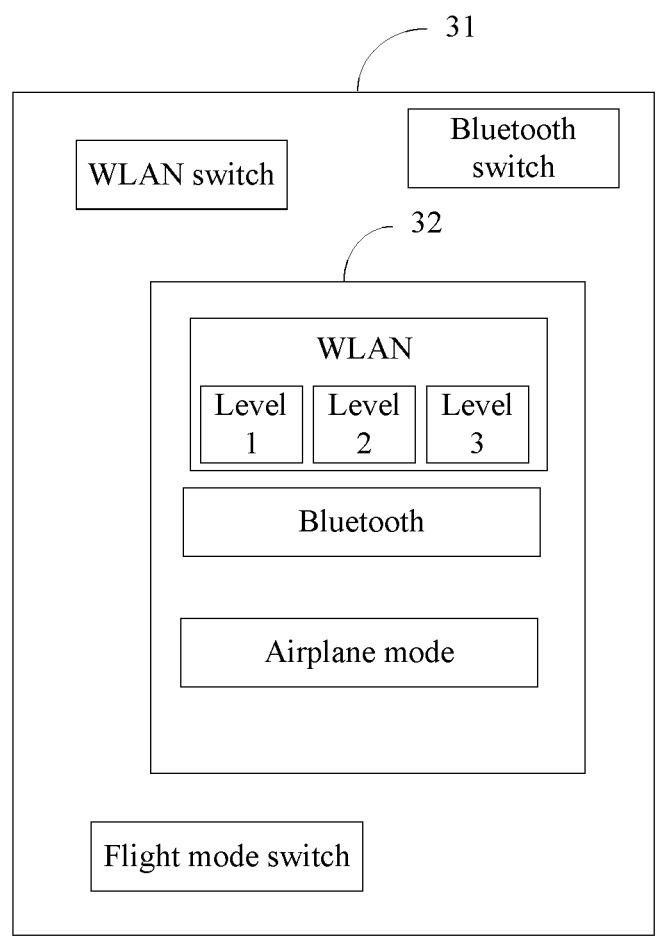
FIG. 4 is an example diagram 3 of an application interface display method according to some embodiments of the present disclosure.

Then, the user touches a WLAN option in the main interface of the shrunk system setting application program, and in response to the touch operation, the mobile terminal displays three level options of the WLAN option in the intermediate area of the current display interface: level 1, level 2, and level 3 (in this case, a display effect of the mobile terminal is shown in FIG. 4).

Figure 5:
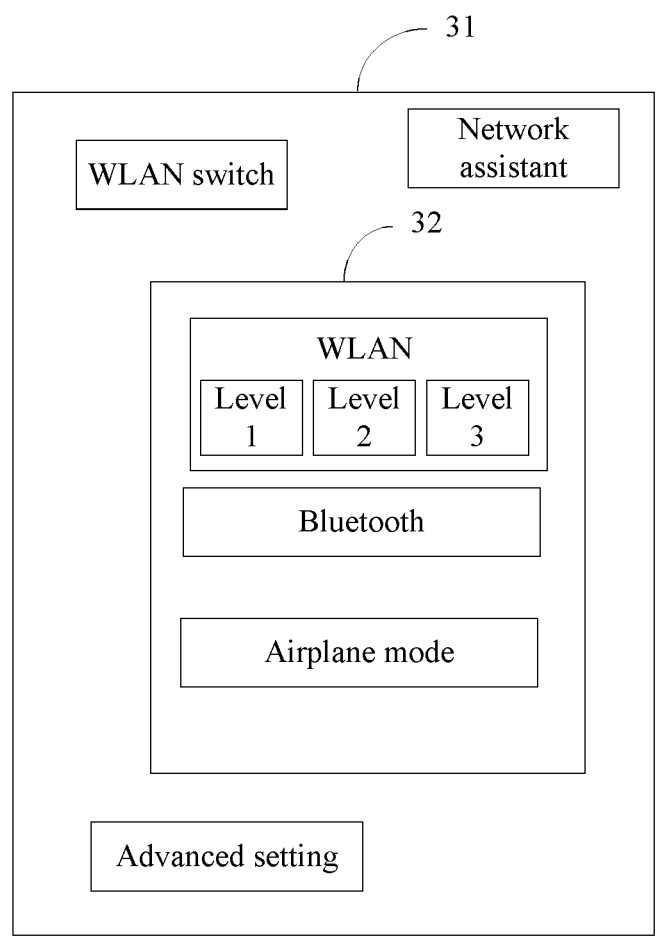
FIG. 5 is an example diagram 4 of an application interface display method according to some embodiments of the present disclosure.

Finally, when the user touches the level option "level 1" (that the user touches the level option "level 1" may be understood as the "second operation performed by the user on the target level option in the plurality of level options" in this embodiment of the present disclosure), in response to this operation, the mobile terminal displays a function option at the first level of the WLAN in the edge area around the current display interface (in this case, a display effect of the mobile terminal is shown in FIG. 5). When the user touches the level option "level 2", in response to this operation, the mobile terminal displays a function option (not shown) at the second level of the WLAN in the edge area around the current display interface. When the user touches the level option "level 3", in response to this operation, the mobile terminal displays a function option (not shown) at the third level of the WLAN in the edge area around the current display interface.

A function option at a corresponding level of the target function option can be conveniently searched by simply operating a corresponding level option in the target application program interface, thereby making function viewing and operating simpler and more convenient. In addition, because the plurality of level options are displayed in the first display area, the user can also know the number of levels included in the target function option. This is more conducive to the user who is not familiar with the target function option.

Optionally, the second operation is a touch operation on the target function option; and the displaying, in a second display area, a function option at a level that corresponds to the second operation and that is of the target function option includes:

determining a corresponding target level based on repetition times of the touch operation, and displaying a function option at the target level of the target function option in the second display area.

The determining a corresponding target level based on repetition times of the touch operation may be understood as: in a case that the repetition times of the touch operation is N (N is a positive integer), determining that the corresponding target level is an $N^{th}$ level. The displaying a function option at a target level of the target function option in the second display area may be understood as displaying some function options at the target level of the target function option in the second display area, or may be understood as displaying all function options at the target level of the target function option in the second display area.

For ease of understanding, herein, an example in which a system setting application program is the target application program, a main interface of the system setting application program is the target application program interface, and a WLAN option (assuming that the WLAN option includes four levels) is the target function option is used for description.

After the mobile terminal controls the main interface of the system setting application program to be displayed in the first display area through shrinking, when the user touches the WLAN option once, the mobile terminal displays all function options at a first level of the WLAN option in the second display area; when the user touches the WLAN option twice, the mobile terminal displays all function options at a second level of the WLAN option in the second display area; and by analogy, when the user touches the WLAN option three times, the mobile terminal displays all function options at a third level of the WLAN option in the second display area; and when the user touches the WLAN option four times, the mobile terminal displays all function options at a fourth level of the WLAN option in the second display area.

The corresponding target level may be determined based on the repetition times of the touch operation, and the function option at the target level of the target function option is displayed in the second display area, so that a function option at each level of the target function option can be conveniently searched by controlling the repetition times of the touch operation. In this way, function viewing and operating can be more convenient.

Optionally, the second operation is a slide operation on the target function option; and the displaying, in a second display area, a function option at a level that corresponds to the second operation and that is of the target function option includes:

determining a corresponding target level based on a slide direction of the slide operation, and displaying a function option at the target level of the target function option in the second display area.

Different slide directions of the slide operation may be corresponding to different levels of the target function option.

The corresponding target level may be determined based on the slide direction of the slide operation, and the function option at the target level of the target function option is displayed in the second display area, so that function options at each level of the target function option can be conveniently searched by controlling the slide direction of the slide operation. An operation is simple and convenient, which meets a usage habit of the user, and therefore, function viewing and operating can be more convenient.

Optionally, the target function option includes M levels, and M is a positive integer; and the determining a corresponding target level based on a slide direction of the slide operation includes:

in a case that the slide direction is a first direction, determining that the corresponding target level is an M-th level;

or in a case that the slide direction is a second direction, determining that the corresponding target level is the first level.

The first direction and the second direction may be opposite directions. For example, the first direction may be leftward, and the second direction may be rightward; or the first direction may be upward, and the second direction may be downward. For example, when the slide direction is leftward sliding, it is determined that the corresponding target level is the M-th level. When the slide direction is rightward sliding, it is determined that the corresponding target level is the first level.

It should be noted that a target function option specific to the slide operation may be determined based on a start position of the slide operation, that is, when the start position of the slide operation is where a function option is located, the function option may be used as the target function option.

A function option at a deepest level of the target function option can be quickly searched by performing a slide operation in the first direction on the target function option, and a function option at a shallowest level of the target function option can be quickly returned by performing a slide operation in the second direction on the target function option. Operation is simple and convenient, so that the user can quickly view the deepest level or the shallowest level, thereby making function viewing and operating more convenient.

Optionally, the second operation is a touch operation on the target function option; and the displaying, in a second display area, a function option at a level that corresponds to the second operation and that is of the target function option includes:

determining a corresponding target level based on repetition times of the touch operation, and displaying a function option at the target level of the target function option in the second display area; and after the determining a corresponding target level based on repetition times of the touch operation, and displaying a function option at the target level of the target function option in the second display area, the application interface display method further includes:

receiving a slide operation performed by the user on the target function option; and determining a corresponding target level based on a slide direction of the slide operation, and displaying a function option at the target level of the target function option in the second display area.

Different slide directions of the slide operation may be corresponding to different levels of the target function option. The determining a corresponding target level based on a slide direction of the slide operation may be understood as: in a case that the target function option includes S levels (S is a positive integer) and the slide direction is the first direction, determining that the corresponding target level is an $S^{th}$ level; or in a case that the target function option includes S levels and the slide direction is the second direction, determining that the corresponding target level is the first level.

The corresponding target level may be determined based on the repetition times of the touch operation, and the function option at the target level of the target function option is displayed in the second display area, so that a function option at each level of the target function option can be conveniently searched by controlling the repetition times of the touch operation. In this way, function viewing and operating can be more convenient. In addition, the corresponding target level may be determined based on the slide direction of the slide operation, and the function option at the target level of the target function option is displayed in the second display area, so that a function option at each level of the target function option can be conveniently searched by controlling the slide direction of the slide operation. An operation is simple and convenient, which meets a usage habit of the user, and therefore, function viewing and operating can be more convenient.

It should be noted that the plurality of optional implementations described in this embodiment of the present disclosure may be implemented in combination with each other, or may be separately implemented. This is not limited in this embodiment of the present disclosure.

Figure 6:
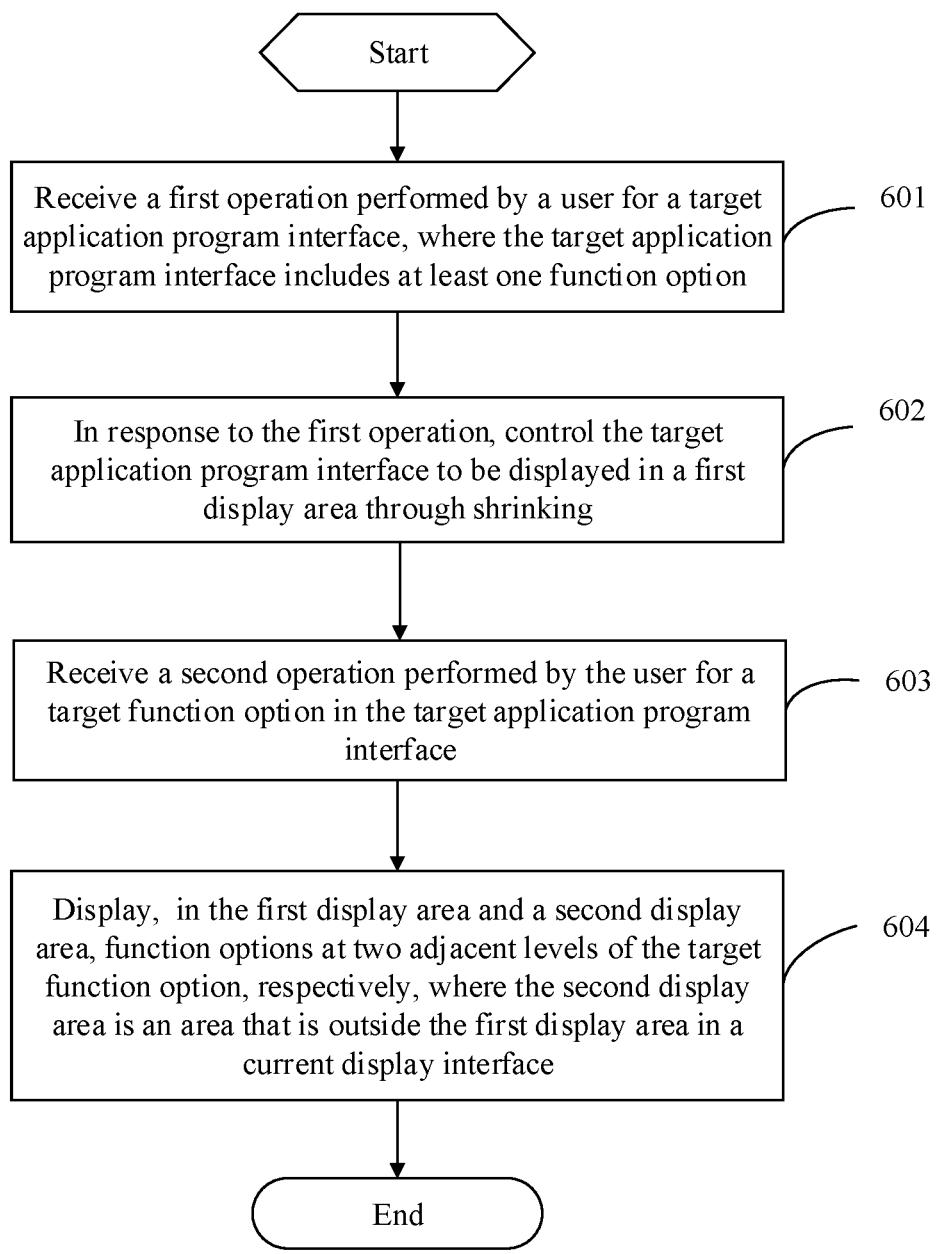
FIG. 6 is a flowchart of an application interface display method according to some other embodiments of the present disclosure.

Referring to FIG. 6, FIG. 6 is a flowchart of an application interface display method according to some other embodiments of the present disclosure. The application interface display method shown in FIG. 6 may be applied to a mobile terminal. For interpretation of the mobile terminal, refer to the descriptions of the corresponding parts in the corresponding embodiment in FIG. 1. Therefore, details are not described herein again.

As shown in FIG. 6, the application interface display method may include the following steps.

Step 601: Receive a first operation performed by a user for a target application program interface, where the target application program interface includes at least one function option.

Step 602: In response to the first operation, control the target application program interface to be displayed in a first display area through shrinking.

Step 603: Receive a second operation performed by the user for a target function option in the target application program interface.

Step 604: Display, in the first display area and a second display area, function options at two adjacent levels of the target function option, respectively, where the second display area is an area that is outside the first display area in a current display interface.

For interpretation of the foregoing target application program, the foregoing target application program interface, the foregoing function option, the foregoing first operation, the foregoing controlling the target application program interface to be shrunk, the foregoing first display area, the foregoing receiving the second operation performed by the user for the target function option in the target application program interface, the foregoing target function option, and the foregoing second display area, refer to the descriptions of the corresponding parts in the corresponding embodiment in FIG. 1. Details are not described herein again.

The foregoing second operation may be a touch operation or a sound control operation that is used to instruct to display, in the first display area and the second display area, function options at two adjacent levels of the target function options, respectively.

The two adjacent levels of the target function option may be any two adjacent levels of the target function option. For example, in a case that the target function option includes four levels, the two adjacent levels of the target function option may be a first level and a second level of the target function option, or may be a second level and a third level of the target function option, or may be a third level and a fourth level of the target function option.

The two adjacent levels of the foregoing target function option may be preset. The two adjacent levels of the target function option may also be determined based on the second operation. For example, in a case that the target function option includes Q (Q is a positive integer greater than 1) levels, when the second operation is a click operation on the target function option in the target application program interface, the two adjacent levels of the target function option may be a first level and a second level of the target function option; or when the second operation is a double-click operation on the target function option in the target application program interface, the two adjacent levels of the target function option may be a Q-th level and a (Q−1)-th level of the target function option.

In actual application, after step 604, if a fourth operation performed by the user on a function option in the first display area or the second display area is received, the mobile terminal may further perform the following step: in response to the fourth operation, respectively displaying, in the first display area and the second display area, function options at next two levels of a level of the function option corresponding to the fourth operation.

For ease of understanding, herein, an example in which a system setting application program is the target application program, a main interface of the system setting application program is the target application program interface, and a WLAN (assuming that the WLAN includes four levels) is the target function option is used for description.

After the mobile terminal controls the main interface of the system setting application program to be displayed in the first display area through shrinking, when the user clicks the WLAN in the main interface of the system setting application program, the mobile terminal displays a function option at a first level of the WLAN in the first display area, and displays a function option at a second level of the WLAN in the second display area.

By analogy, when the user clicks one of function options at the first level of the WLAN displayed in the first display area, the mobile terminal displays a function option at the second level of the WLAN in the first display area, and displays a function option at a third level of the WLAN in the second display area; or when the user clicks one of function options at the second level of the WLAN displayed in the second display area, the mobile terminal displays a function option at a third level of the WLAN in the first display area, and displays a function option at a fourth level of the WLAN in the second display area.

In addition, it should be noted that, when the control target application program interface is controlled to be displayed in the first display area through shrinking, or after the control target application program interface is controlled to be displayed in the first display area through shrinking and before step 204, content may be displayed (for example, at least one function option of the target application program may be displayed) or no content may be displayed in an area (for example, the second display area) of the current display interface other than the first display area. This is not limited in this embodiment of the present disclosure.

In this embodiment of the present disclosure, because the mobile terminal may simultaneously display function options at two levels in a display interface, viewing and operating of multi-level function options do not need to be performed level by level, so that viewing and operating of a function option can be simplified, and further function searching can be more convenient.

Optionally, after the displaying, in the first display area and the second display area, function options at two adjacent levels of the target function option, respectively, the method further includes:

receiving a third operation performed by the user for a blank position of the second display area; and in response to the third operation, controlling the first display area to display the target application program interface.

The blank position may be a position at which a function option that is not displayed in the second display area. It should be noted that the blank position is only a function option that is not displayed, but information other than the function option may be displayed. For example, a background may still be displayed at the blank position.

The third operation may be an operation used to instruct to control the target application program interface to be displayed in the first display area. The third operation may be a touch operation, such as a click operation or a double-click operation. The third operation may also be a sound control operation.

When the third operation performed by the user for the blank position of the second display area is received, the target application program interface is controlled to be displayed in the first display area, so that the user can quickly return to an original target application program interface. In this way, an operation performed by the user can be more convenient, and therefore function viewing and operating can be more convenient.

Optionally, after the receiving a first operation performed by a user for a target application program interface of a target application program, the method further includes:

in response to the first operation, displaying at least one common function option in the second display area, where the common function option is a function option for which access times exceeds preset times.

The common function option may be a function option for which access times at a level of the target application program exceeds preset times. For example, the common function option may be a WLAN switch, a Bluetooth switch, or a flight mode.

When a plurality of common function options are displayed in the second display area, the plurality of common function options may be a plurality of function options at a same level of the target application program, or may be a plurality of function options at different levels of the target application program.

The at least one common function option can be displayed in the second display area in response to the first operation, so that the common function option can be directly viewed from the second display area after the target application program interface program is shrunk. In this way, convenience of function searching can be further improved.

It should be noted that the plurality of optional implementations described in this embodiment of the present disclosure may be implemented in combination with each other, or may be separately implemented. This is not limited in this embodiment of the present disclosure.

It should be further noted that the plurality of implementations described in the present disclosure may be implemented in combination with each other, or may be separately implemented. This is not limited in the present disclosure.

Figure 7:
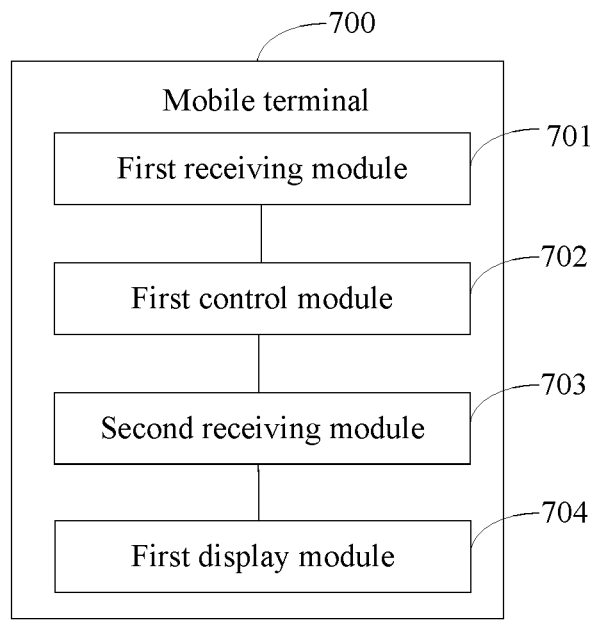
FIG. 7 is a structural diagram 1 of a mobile terminal according to some embodiments of the present disclosure.

Referring to FIG. 7, FIG. 7 is a structural diagram of a mobile terminal according to some embodiments of the present disclosure. As shown in FIG. 7, a mobile terminal 700 includes:

a first receiving module 701, configured to receive a first operation performed by a user for a target application program interface, where the target application program interface includes at least one function option;

a first control module 702, configured to: in response to the first operation, control the target application program interface to be displayed in a first display area through shrinking;

a second receiving module 703, configured to receive a second operation performed by the user for a target function option in the target application program interface; and a first display module 704, configured to: display, in a second display area, a function option at a level that corresponds to the second operation and that is of the target function option; or display, in the first display area and a second display area, function options at two adjacent levels of the target function option, respectively, where the second display area is an area that is outside the first display area in a current display interface.

Figure 8:
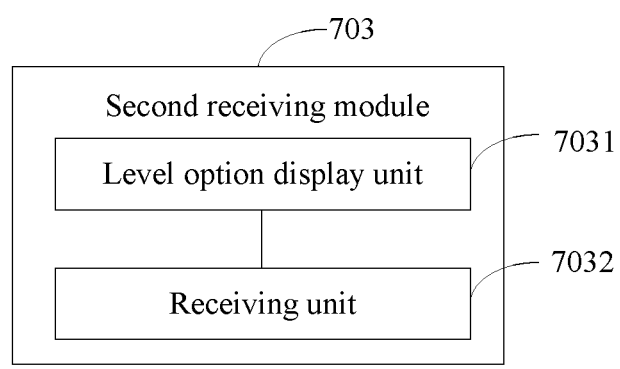
FIG. 8 is a structural diagram of a second receiving module in a mobile terminal according to some embodiments of the present disclosure.

Optionally, as shown in FIG. 8, the second receiving module 703 includes:

a level option display unit 7031, configured to display a plurality of level options of the target function option in the first display area; and a receiving unit 7032, configured to receive a second operation performed by the user for a target level option in the plurality of level options; and the first display module 704 is configured to:

display a function option at a target level of the target function option in the second display area, where the target level is a level corresponding to the target level option.

Optionally, the second operation is a touch operation on the target function option; and the first display module 704 is configured to:

determine a corresponding target level based on repetition times of the touch operation, and display a function option at the target level of the target function option in the second display area.

Optionally, the second operation is a slide operation on the target function option; and the first display module 704 is configured to:

determine a corresponding target level based on a slide direction of the slide operation, and display a function option at the target level of the target function option in the second display area.

Optionally, the target function option includes M levels, and M is a positive integer; and the first display module 704 is configured to:

in a case that the slide direction is a first direction, determine that the corresponding target level is an M-th level; or in a case that the slide direction is a second direction, determine that the corresponding target level is the first level.

Figure 9:
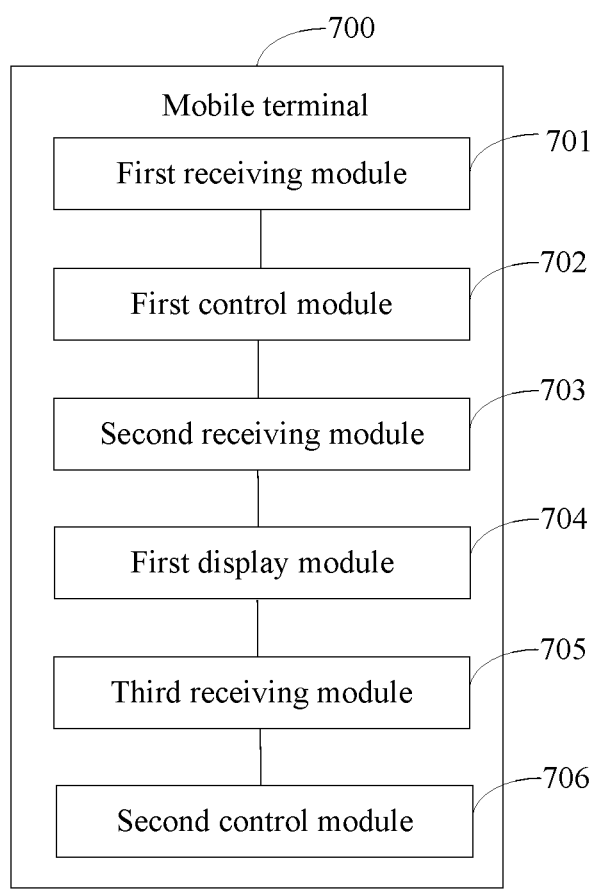
FIG. 9 is a structural diagram 2 of a mobile terminal according to some embodiments of the present disclosure.

Optionally, as shown in FIG. 9, the mobile terminal 700 further includes:

a third receiving module 705, configured to receive a third operation performed by the user for a blank position of the second display area; and a second control module 706, configured to: in response to the third operation, control the first display area to display the target application program interface.

Figure 10:
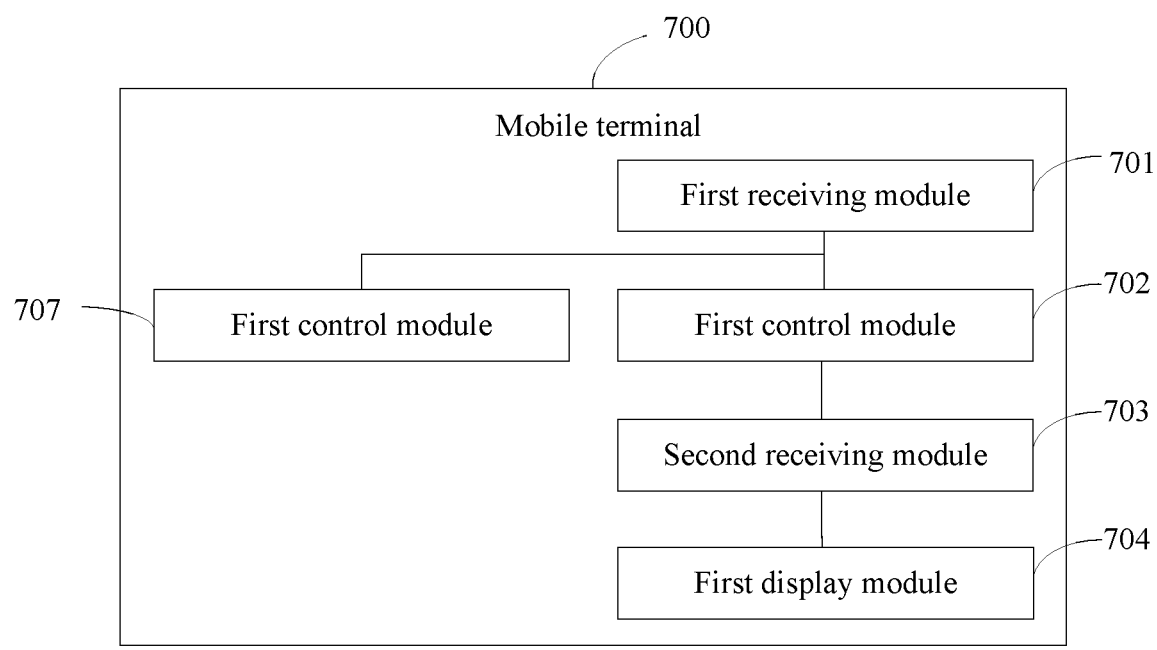
FIG. 10 is a structural diagram 3 of a mobile terminal according to some embodiments of the present disclosure.

Optionally, as shown in FIG. 10, the mobile terminal 700 further includes:

a second display module 707, configured to: in response to the first operation, display at least one common function option in the second display area, where the common function option is a function option for which access times exceeds preset times.

The mobile terminal 700 can implement each process implemented by the mobile terminal in the method embodiments in FIG. 1 to FIG. 6. To avoid repetition, details are not described herein again.

The mobile terminal 700 in this embodiment of the present disclosure provides two manners of viewing multi-level function options are provided. First, a function option at a corresponding level may be directly displayed by receiving an operation. Second, function options at two levels may be simultaneously displayed on a display interface. In either of the foregoing manners, viewing and operating of the multi-level function options do not need to be performed level by level, so that viewing and operating of a function option can be simplified, and further function searching can be more convenient.

Figure 11:
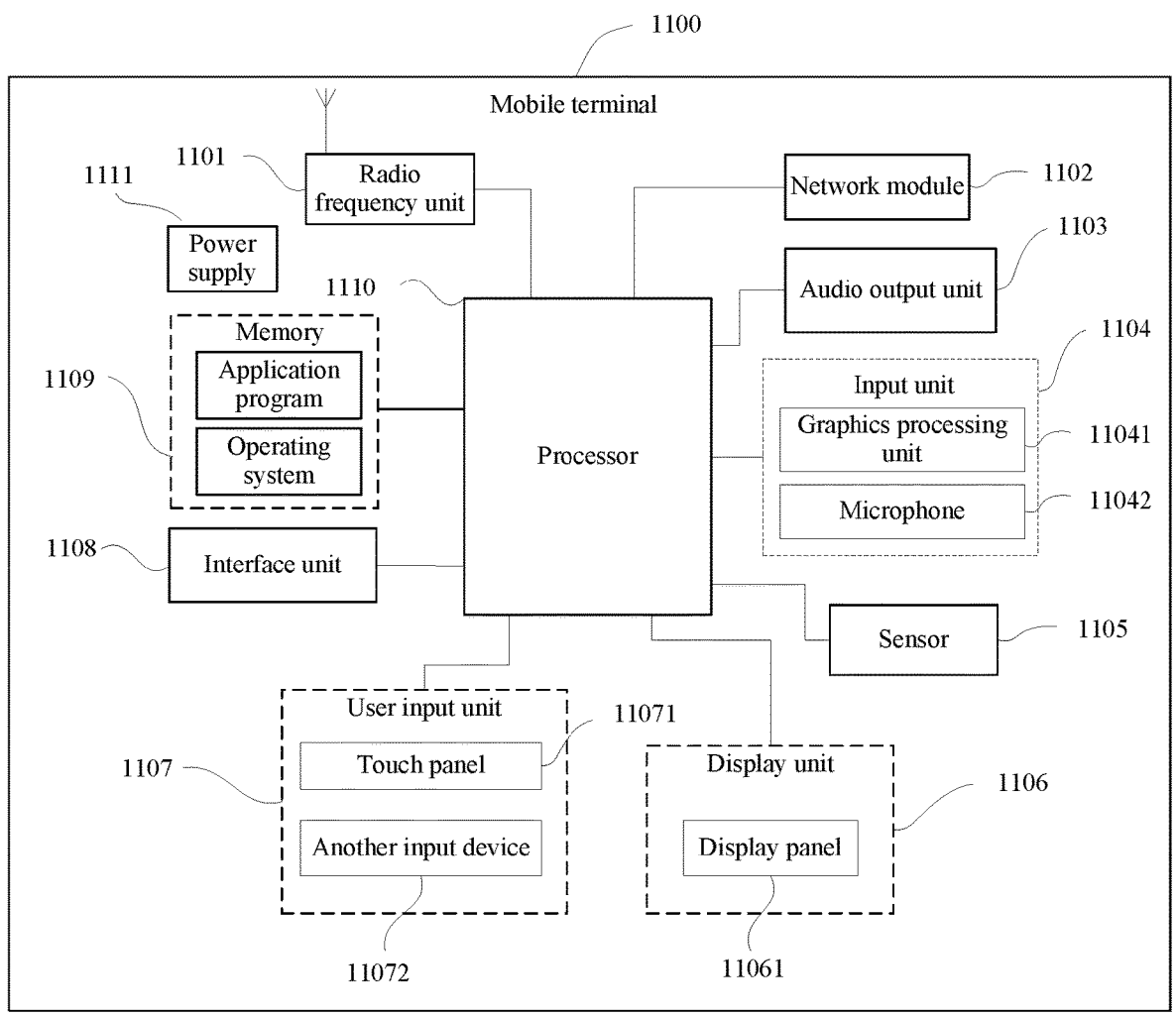
FIG. 11 is a structural diagram of a mobile terminal according to some other embodiments of the present disclosure.

FIG. 11 is a schematic structural diagram of hardware of a mobile terminal according to the embodiments of the present disclosure. A mobile terminal 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. A person skilled in the art may understand that the structure of the mobile terminal shown in FIG. 11 constitutes no limitation on the mobile terminal, and the mobile terminal may include more or fewer parts than those shown in the figure, or combine some parts, or have a different part arrangement. In this embodiment of the present disclosure, the mobile terminal includes, but is not limited to, a mobile phone, a tablet computer, a laptop computer, a palmtop computer, an in-vehicle terminal, a wearable device, a pedometer, and the like.

The processor 1110 is configured to:

receive a first operation performed by a user for a target application program interface, where the target application program interface includes at least one function option;

in response to the first operation, control the target application program interface to be displayed in a first display area through shrinking;

receive a second operation performed by the user for a target function option in the target application program interface; and display, in a second display area, a function option at a level that corresponds to the second operation and that is of the target function option; or display, in the first display area and a second display area, function options at two adjacent levels of the target function option, respectively, where the second display area is an area that is outside the first display area in a current display interface.

Optionally, the receiving, by the processor 1110, a second operation performed by the user for a target function option in the target application program interface includes:

displaying a plurality of level options of the target function option in the first display area; and receiving a second operation performed by the user for a target level option in the plurality of level options; and the displaying, by the processor 1110 in a second display area, a function option at a level that corresponds to the second operation and that is of the target function option includes:

displaying a function option at a target level of the target function option in the second display area, where the target level is a level corresponding to the target level option.

Optionally, the second operation is a touch operation on the target function option; and the displaying, by the processor 1110 in a second display area, a function option at a level that corresponds to the second operation and that is of the target function option includes:

determining a corresponding target level based on repetition times of the touch operation, and displaying a function option at the target level of the target function option in the second display area.

Optionally, the second operation is a slide operation on the target function option; and the displaying, by the processor 1110 in a second display area, a function option at a level that corresponds to the second operation and that is of the target function option includes:

determining a corresponding target level based on a slide direction of the slide operation, and displaying a function option at the target level of the target function option in the second display area.

Optionally, the target function option includes M levels, and M is a positive integer; and the determining, by the processor 1110, a corresponding target level based on a slide direction of the slide operation includes: in a case that the slide direction is a first direction, determining that the corresponding target level is an M-th level; or in a case that the slide direction is a second direction, determining that the corresponding target level is the first level. Optionally, the processor 1110 is further configured to:

receive a third operation performed by the user for a blank position of the second display area; and in response to the third operation, control the first display area to display the target application program interface.

Optionally, the processor 1110 is further configured to:

in response to the first operation, display at least one common function option in the second display area, where the common function option is a function option for which access times exceeds preset times.

The mobile terminal 1100 can implement each process implemented by the mobile terminal in the foregoing embodiments. To avoid repetition, details are not described herein again.

The mobile terminal 1100 in this embodiment of the present disclosure provides two manners of viewing multi-level function options are provided. First, a function option at a corresponding level may be directly displayed by receiving an operation. Second, function options at two levels may be simultaneously displayed on a display interface. In either of the foregoing manners, viewing and operating of the multi-level function options do not need to be performed level by level, so that viewing and operating of a function option can be simplified, and further function searching can be more convenient.

It should be understood that, in this embodiment of the present disclosure, the radio frequency unit 1101 may be configured to receive and send information or a signal in a call process. For example, after receiving downlink data from a base station, the radio frequency unit 1101 sends the downlink data to the processor 1110 for processing. In addition, the radio frequency unit 1101 sends uplink data to the base station. Usually, the radio frequency unit 1101 includes but is not limited to an antenna, at least one amplifier, a transceiver, a coupler, a low noise amplifier, a duplexer, and the like. In addition, the radio frequency unit 1101 may communicate with a network and another device through a wireless communication system.

The mobile terminal provides wireless broadband Internet access for the user by using the network module 1102, for example, helping the user to send and receive an e-mail, brows a web page, and access streaming media.

The audio output unit 1103 may convert audio data received by the radio frequency unit 1101 or the network module 1102 or stored in the memory 1109 into an audio signal and output the audio signal as a sound. In addition, the audio output unit 1103 may further provide an audio output (for example, a call signal received voice, or a message received voice) related to a specific function implemented by the mobile terminal 1100. The audio output unit 1103 includes a speaker, a buzzer, a telephone receiver, and the like.

The input unit 1104 is configured to receive an audio signal or a video signal. The input unit 1104 may include a graphics processing unit (GPU) 11041 and a microphone 11042. The graphics processing unit 11041 processes image data of a static image or video obtained by an image capture apparatus (such as, a camera) in a video capture mode or an image capture mode. A processed image frame may be displayed on the display unit 1106. The image frame processed by the graphics processing unit 11041 may be stored in the memory 1109 (or another storage medium) or sent by using the radio frequency unit 1101 or the network module 1102. The microphone 11042 can receive a sound and can process the sound into audio data. The processed audio data may be converted, in a call mode, into a format that can be sent by the radio frequency unit 1101 to a mobile communication base station for output.

The mobile terminal 1100 may further include at least one sensor 1105 such as an optical sensor, a motion sensor, or another sensor. For example, the optical sensor includes an ambient light sensor and a proximity sensor. The ambient light sensor may adjust luminance of the display panel 11061 according to brightness of ambient light. The proximity sensor may turn off the display panel 11061 and/or backlight when the mobile terminal 1100 moves to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 1105 may further include a fingerprint sensor, a pressure sensor, an iris sensor, a molecular sensor, a gyroscope, a barometer, a hygrometer, a thermometer, an infrared sensor, and the like. Details are not described herein.

The display unit 1106 is configured to display information entered by a user or information provided for a user. The display unit 1106 may include a display panel 11061, and the display panel 11061 may be configured in a form of a liquid crystal display (LCD), an organic light-emitting diode (OLED), or the like.

The user input unit 1107 may be configured to: receive digit or character information that is input, and generate key signal input related to user setting and function control of the mobile terminal. For example, the user input unit 1107 includes a touch panel 11071 and another input device 11072. The touch panel 11071 is also referred to as a touchscreen, and may collect a touch operation performed by a user on or near the touch panel 11071 (such as an operation performed by a user on the touch panel 11071 or near the touch panel 11071 by using any proper object or accessory, such as a finger or a stylus). The touch panel 11071 may include two parts: a touch detection apparatus and a touch controller. The touch detection device detects a touch position of the user, detects a signal brought by the touch operation, and sends the signal to the touch controller. The touch controller receives touch information from the touch detection device, converts the touch information into touch point coordinates, sends the touch point coordinates to the processor 1110, and receives and executes a command sent by the processor 1110. In addition, the touch panel 11071 may be implemented by using a plurality of types such as a resistive type, a capacitive type, an infrared ray, and a surface acoustic wave. The user input unit 1107 may include another input device 11072 in addition to the touch panel 11071. For example, the another input device 11072 may include but is not limited to a physical keyboard, a functional button (such as a volume control button or a power on/off button), a trackball, a mouse, and a joystick. Details are not described herein.

The touch panel 11071 may cover the display panel 11061. When detecting a touch operation on or near the touch panel 11071, the touch panel 11071 transmits the touch operation to the processor 1110 to determine a type of a touch event. Then, the processor 1110 provides corresponding visual output on the display panel 11061 based on the type of the touch event. In FIG. 11, although the touch panel 11071 and the display panel 11061 are used as two independent parts to implement input and output functions of the mobile terminal, in some embodiments, the touch panel 11071 and the display panel 11061 may be integrated to implement the input and output functions of the mobile terminal. Details are not described herein.

The interface unit 1108 is an interface for connecting an external apparatus with the mobile terminal 1100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 1108 may be configured to receive input (such as data information and power) from the external apparatus and transmit the received input to one or more elements in the mobile terminal 1100, or may be configured to transmit data between the mobile terminal 1100 and the external apparatus.

The memory 1109 may be configured to store a software program and various data. The memory 1109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 1109 may include a high-speed random access memory, or may include a non-volatile memory, for example, at least one disk storage device, a flash memory, or another volatile solid-state storage device.

The processor 1110 is a control center of the mobile terminal, and is connected to all parts of the entire mobile terminal by using various interfaces and lines, and performs various functions of the mobile terminal and processes data by running or executing the software program and/or the module that are stored in the memory 1109 and invoking the data stored in the memory 1109, to implement overall monitoring on the mobile terminal. The processor 1110 may include one or more processing units. Optionally, an application processor and a modem processor may be integrated into the processor 1110. The application processor mainly processes an operating system, a user interface, an application program, and the like. The modem processor mainly processes wireless communications. It can be understood that the foregoing modem processor may not be integrated into the processor 1110.

The mobile terminal 1100 may further include the power supply 1111 (for example, a battery) that supplies power to each component. Optionally, the power supply 1111 may be logically connected to the processor 1110 by using a power management system, so as to implement functions such as charging management, discharging management, and power consumption management by using the power management system.

In addition, the mobile terminal 1100 includes some function modules not shown, and details are not described herein.

Optionally, an embodiment of the present disclosure further provides a mobile terminal, including a processor 1110, a memory 1109, and a computer program that is stored in the memory 1109 and executable on the processor 1110. When the computer program is executed by the processor 1110, the foregoing processes of the application interface display method embodiment are implemented and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the foregoing processes of the application interface display method embodiment are implemented and a same technical effect can be achieved. To avoid repetition, details are not described herein again. The non-transitory computer-readable storage medium may be a read-only memory (ROM), a random access memory (RAM), a magnetic disk, an optical disc, or the like.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. An element limited by "includes a . . ." does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the related art may be implemented in a form of a software product. The computer software product is stored in a storage medium (such as a ROM/RAM, a hard disk, or a compact disc), and includes several instructions for instructing a terminal (which may be a mobile phone, a computer, a server, an air conditioner, a network device, or the like) to perform the method described in the embodiments of the present disclosure.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It can be clearly understood by a person skilled in the art that, for the purpose of convenient and brief description, for a detailed operating process of the foregoing system, apparatus, and unit, refer to a corresponding process in the foregoing method embodiments. Details are not described herein again.

In the embodiments provided in this application, it should be understood that the disclosed apparatus and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the related art may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling related hardware. The program may be stored in a computer-readable storage medium. When the program runs, the processes of the methods in the embodiments are performed. The foregoing storage medium may be a magnetic disc, an optical disc, a read-only memory (ROM), a random access memory (RAM), or the like.

It can be understood that the embodiments described in the embodiments of the present disclosure may be implemented by hardware, software, firmware, middleware, microcode, or a combination thereof. For hardware implementation, a module, a unit, or a subunit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, or other electronic units or a combination thereof used to perform the functions in the present disclosure.

For software implementation, the technology in the embodiments of the present disclosure may be implemented through modules (for example, procedures or functions) that perform the functions in the embodiments of the present disclosure. Software code may be stored in a memory and executed by a processor. The memory may be implemented in the processor or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An application interface display method, applied to a mobile terminal and comprising:
    receiving a first operation performed by a user for a target application program interface, wherein the target application program interface comprises at least one function option;
    in response to the first operation, controlling the target application program interface to be displayed in a first display area through shrinking;
    receiving a second operation performed by the user for a target level option in a plurality of level options; wherein the plurality of level options are level options of a target function option and are displayed in the first display area; and the plurality of level options correspond to different levels of the target function option respectively; and
    displaying, in a second display area, a function option at a target level of the target function option; wherein the target level is a level corresponding to the target level option;
    wherein the second display area is an area outside the first display area in a current display interface.

2. The method according to claim 1, wherein after the receiving a first operation performed by a user for a target application program interface, the method further comprises:
    in response to the first operation, displaying at least one common function option in the second display area, wherein the common function option is a function option for which access times exceeds preset times.

3. A mobile terminal, comprising a processor, a memory, and a computer program that is stored in the memory and executable on the processor, wherein the computer program, when executed by the processor, causes the mobile terminal to perform:
    receiving a first operation performed by a user for a target application program interface, wherein the target application program interface comprises at least one function option;
    in response to the first operation, controlling the target application program interface to be displayed in a first display area through shrinking;
    receiving a second operation performed by the user for a target level option in a plurality of level options; wherein the plurality of level options are level options of a target function option and are displayed in the first display area; and the plurality of level options correspond to different levels of the target function option respectively; and
    displaying, in a second display area, a function option at a target level of the target function option; wherein the target level is a level corresponding to the target level option;
    wherein the second display area is an area outside the first display area in a current display interface.

4. The mobile terminal according to claim 3, wherein the computer program, when executed by the processor, causes the mobile terminal to further perform:
    in response to the first operation, displaying at least one common function option in the second display area, wherein the common function option is a function option for which access times exceeds preset times.

5. A non-transitory computer-readable storage medium, wherein the non-transitory computer-readable storage medium stores a computer program, and wherein the computer program, when executed by a processor of a mobile terminal, causes the mobile terminal to perform:
    receiving a first operation performed by a user for a target application program interface, wherein the target application program interface comprises at least one function option;
    in response to the first operation, controlling the target application program interface to be displayed in a first display area through shrinking;
    receiving a second operation performed by the user for a target level option in a plurality of level options; wherein the plurality of level options are level options of a target function option and are displayed in the first display area; and the plurality of level options correspond to different levels of the target function option respectively; and displaying, in a second display area, a function option at a target level of the target function option; wherein the target level is a level corresponding to the target level option;

wherein the second display area is an area outside the first display area in a current display interface.

* * * * *